United States Patent [19]

Houle

[11] 4,392,500
[45] Jul. 12, 1983

[54] GRAIN COMBINE WITH IMPROVED STRAW WALKER

[76] Inventor: Howard E. Houle, 720 Adams St., Anoka, Minn. 55303

[21] Appl. No.: 280,443

[22] Filed: Jul. 6, 1981

[51] Int. Cl.³ .............................................. A01F 12/30
[52] U.S. Cl. ...................................................... 130/26
[58] Field of Search .......................... 130/26, 27 R, 24; 56/14.6

[56] References Cited

U.S. PATENT DOCUMENTS

| 2,591,200 | 4/1952 | Rosenthal | 130/26 |
| 2,937,647 | 5/1960 | Allen et al. | 130/26 |

Primary Examiner—Jay N. Eskovitz
Attorney, Agent, or Firm—James V. Harmon

[57] ABSTRACT

A grain combine is disclosed having an improved straw walker for separating grain from chaff and for transporting the straw toward one end of the combine. The improved straw walker comprises a housing within which are mounted a plurality of parallel generally horizontally disposed straw walker boards or channels, each having parallel side walls with upwardly directed teeth along their upper edges. The channels are mounted for orbital motion upon two or more parallel crankshafts by the provision of split bearings connected to each straw walker. Each split bearing includes bearing halves that enclose a bushing through which the crankshaft extends. The crankshafts themselves are each mounted for rotation upon journals supported upon the framework of the combine. Each crankshaft is built up from separate pieces comprising crank arms bored to receive crank throw pins and shaft pins, all rigidly connected together by retaining pins or other suitable fasteners.

5 Claims, 5 Drawing Figures

GRAIN COMBINE WITH IMPROVED STRAW WALKER

FIELD OF THE INVENTION

The present invention relates to grain combines and more particularly to the straw walker mechanism of a grain combine.

THE PRIOR ART

The straw walker mechanism of a grain combine is often subject to malfunction and requires relatively frequent repair often because the operating mechanism tends to become wobbly and gets out of balance easily. This is accompanied by vibration and noise. In one combine it was found that the straw walker moved through an orbit that was 3/32" off center as the machine came from the factory. This produces a total runout of 3/16". In addition to the noise and vibration, the all too frequent repair of the mechanism requires the unit to be dismantled for installation of replacement parts.

OBJECTS

In view of these and other deficiencies of the prior art, it is the primary object of the present invention to provide a grain combine having an improved straw walker with the following characteristics and advantages:
  A. An effective provision for making it possible to enable the straw walker mechanism to oscillate within more precise tolerances.
  B. An effective means for enabling the mechanism to be more readily manufactured so that it will not exhibit undue vibration and noise.
  C. A provision for connecting the crankshaft more effectively to the straw walker channels so as to lessen noise, vibration and wear.
  D. A provision for enabling damaged or worn portions of the crankshaft to be dismantled and replaced without a requirement for replacing the entire crankshaft.
  E. The provision of an improved supporting crankshaft structure for the straw walker mechanism designed to cooperate effectively with tubular plastic bushings supported on the straw walker channels to lessen vibration, reduce noise and maintain precise tolerances.

THE FIGURES

SUMMARY OF THE INVENTION

The present invention relates to a grain combine and to an improvement in the straw walker portion of the grain combine. The straw walker is employed in the grain combine for transferring straw through the combine and for separating the wheat from the chaff. The straw walker normally comprises a plurality of oscillating members with saw teeth along their upper edges. The improved straw walker mechanism of the present invention includes a housing comprising a portion of the grain combine through which the straw is transported by the straw walker. Within the housing portion of the apparatus are a plurality of parallel generally horizontally disposed straw walker elements. Each straw walker element comprises a channel or board including spaced parallel side walls with upwardly directed teeth extending longitudinally along the upper edge thereof. These channels are mounted for orbital motion upon parallel crankshafts. In the present application, two crankshafts are illustrated but more could be used if desired. Split bearings are provided upon the lower aspect of each of the straw walker channels and the crank throw pins of the crankshafts extend through these split bearings. In this way, the straw walkers are mounted upon the throws of the crankshafts to be described below. Each of the crankshafts is built up from separate pieces comprising crank arms which extend vertically, crank throw pins upon which the straw walkers are mounted, and shaft pins at each end supporting the crankshaft for rotation upon the framework of the combine. The crank throw pins and shaft pins are suitably rigidly connected to the crank arms as by retaining pins or other suitable fasteners.

DETAILED DESCRIPTION

Figure 1:
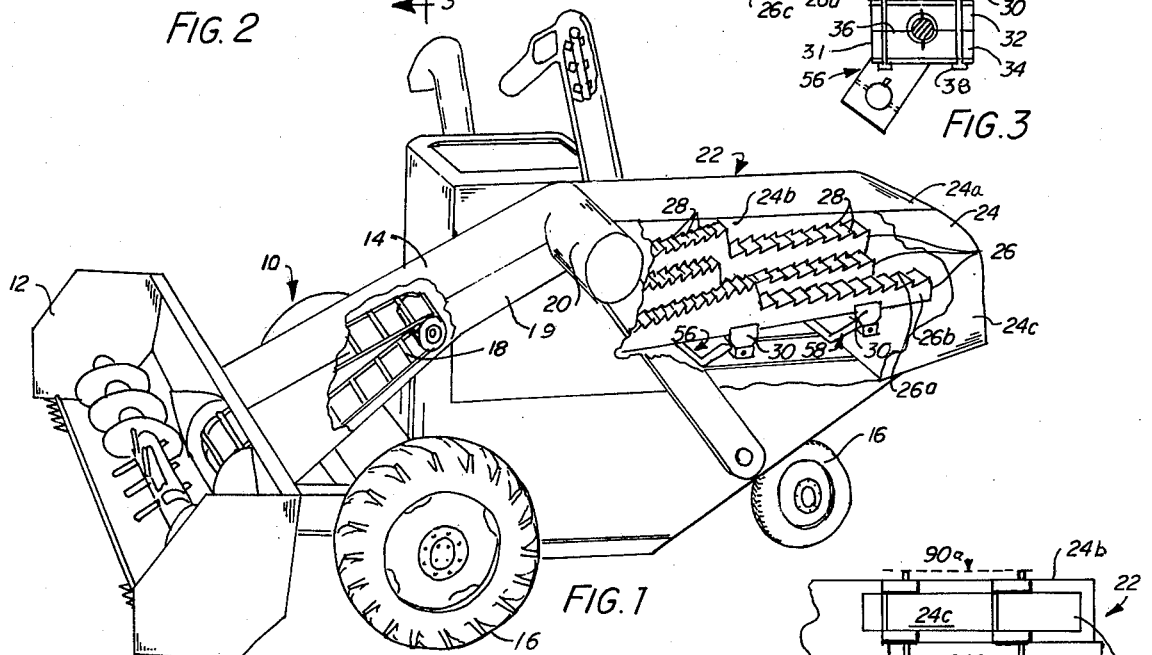
FIG. 1 is a perspective view of a grain combine embodying the invention.
Figure 4:
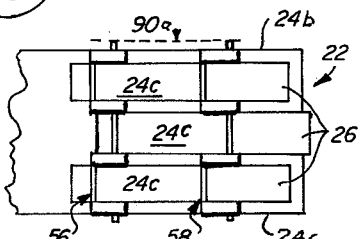
FIG. 4 is a bottom view of the straw walker housing showing the straw walkers and their supporting crankshafts.

Refer now to the figures, particularly FIG. 1. Shown in the figure is a grain combine 10 with an inlet 12 through which grain is taken into the combine. The combine also includes housing 14, supporting wheels 16, and other conventional and well-known components which are entirely conventional and for that reason need not be described in detail herein. Within the combine is a conveyor mechanism 18, 19, 20 that transports the grain rearwardly through the combine to the straw walker indicated generally by numeral 22. The straw walker includes a housing 24 having a top wall 24a, side walls 24b and 24c. Within the straw walker housing 24 are three straw walker channels 26, each having parallel side walls 26a and 26b and a bottom wall 26c. The straw walkers 26 are all horizontally disposed and supported parallel to one another as best seen in FIGS. 1 and 4. Saw teeth 28 are provided along the upper edge of the side walls 26a and 26b of the channels 26 for the purpose of transporting the straw through the housing 24 from left to right as seen in FIG. 1.

Figure 3:
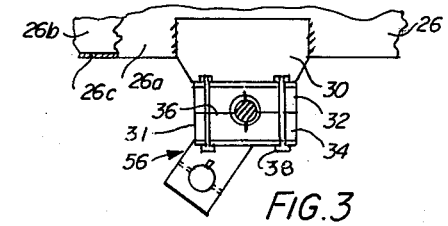
FIG. 3 is a partial transverse sectional view taken on Line 3—3 of FIG. 2.

At the bottom of each straw walker are provided two bearing support brackets 30, one such bracket being provided near each end. Suitably secured to the bottom of each bracket 30 is a split bearing 31 composed of upper and lower split halves 32 and 34 that can be taken apart along separation line 36 (FIG. 3). The halves of the split bearing are secured together by the provision of bolts 38 which extend into the bracket 30. Within the center of the split bearing is a bushing 40 which is generally tubular in shape and extends horizontally from one end of the bearing to the other.

The ends of these split bearings are counterbored at 42 and 44 to receive bearing seals 46 and 48 respectively, and each of these bearing seals is secured in place by means of a collar 50 holding the bearing seals 46, 48 against the bearing during operation to prevent the entry of dust.

Figure 2:
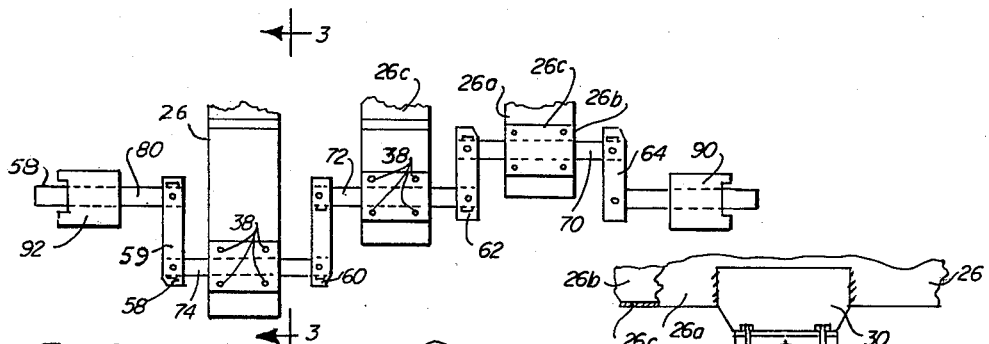
FIG. 2 is a view of one crankshaft supporting three straw walker channels as seen from below.
Figure 5:
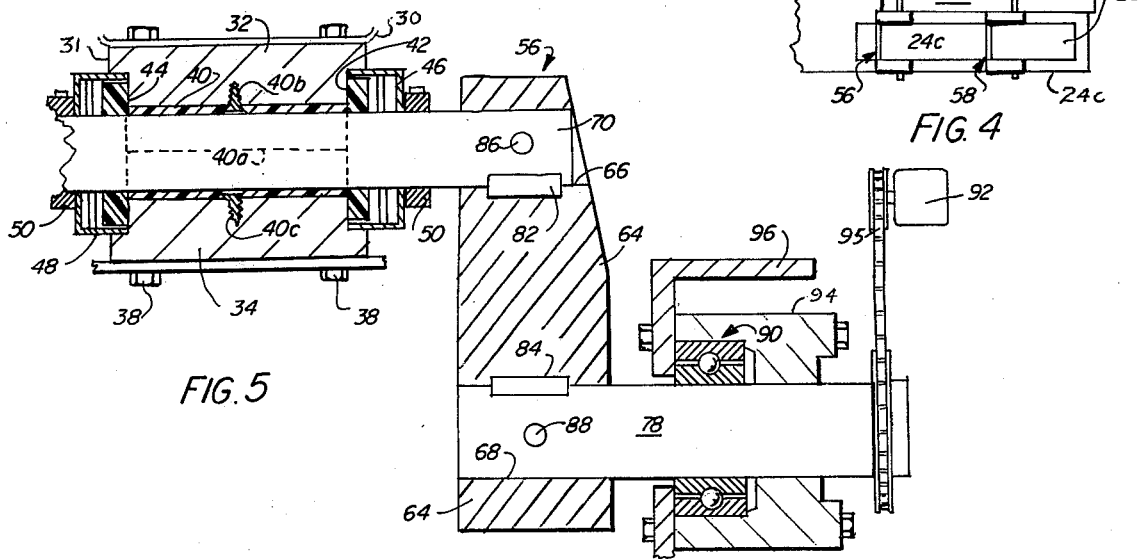
FIG. 5 is a partial vertical sectional view of the end of one of the crankshafts on an enlarged scale.

The straw walker elements 26 are supported upon a pair of parallel longitudinally spaced apart crankshafts 56 and 58 extending at right angles to the straw walker elements 26 which will now be described with particular reference to FIGS. 2 and 5.

Each of the crankshafts comprises in this instance four vertically disposed parallel crank arms 59, 60, 62 and 64 with parallel bores 66 and 68 at each end (FIG. 5) adapted to receive crank throw pins 70, 72, 74, each of which passes through one of the split bearings 32, 34. The end portion of each crankshaft comprises a crankshaft pin 78, 80 mounted within one of the bores 68 of the crank arms 64 and 59 respectively. The pins are secured within their respective bores in the crank arms by the provision of rectangular keys 82 and 84 as well as cold rolled steel retaining pins 86 and 88. To receive the keys 82, 84 the pins 70 to 80 are suitably machined and bored to receive the pins 86 and 88. The outer end of the shaft pins 78 and 80 are journaled for rotation in self-aligning bearings 90 and 92 which are themselves supported within bearing blocks 94 that are in turn secured to frame elements such as an angle iron 96 (FIG. 5) that is bolted or otherwise affixed to the framework of the combine. The crankshafts 56 and 58 are driven at the same speed and in the same direction by an interconnecting drive such as a belt and pulley assembly 90a (FIG. 4). Motion is imparted to the crankshafts by a motive power means 92 driving through a belt and pulley assembly 95. In this way, as the motive power means drives one crankshaft 56, the other 58 driven at the same speed and in the same direction, thereby imparting oscillatory or orbital movement to the straw walkers 26.

The sleeve-like bushings 40 can comprise a single tube, and as clearly shown in the drawings, by removing the crank throw pins from the crank arms, the tubular bushing 40 can easily be removed over the end of the crank throw pin. It is also possible, however, to provide a bushing 40 which is split longitudinally along line 40a (FIG. 5) in which case the halves can be secured to their adjacent bearing section by the provision of fasteners such as screws 40b and 40c. The bushings 40 can comprise any suitable bearing material. A non-metallic plastic resinous bushing is preferred such as Nylon, Delrin or other suitable bearing material including those composed of pressed fiber and resin. Plastic resin is preferred because of its self-lubricating properties. The plastic bushings in accordance with the invention are particularly effective since nylon or other resin can be made to operate effectively due to the precision and surface uniformity of the improved crankshafts 56 and 58. The throw pins are preferably turned ground and polished. It will be seen that if repairs are required on either of the crankshafts because of wear or damage, only one of the split bearings and crank throw pins need be removed and replaced. The damaged pin is simply pressed out and another is pressed back into its place. Repairs are therefore inexpensive and can be made quickly.

In a typical application, the stroke of each of the crank throw pins is about 6", i.e. each throw pin is about 3" from the center line of the crankshaft. Typically, the crankshafts are about 35" long and rotate at about 190 rpm during operation.

A prototype of the invention has been operated for over 1,000 hours without trouble. It was found that precise tolerances could be maintained since the pins and crank arms could be made to precise tolerances. The unit in operation has proved to be very durable and is almost vibration-free. In addition, the seals 46, 48 keep dust out of the bearings and in that way reduce the likelihood of wear, particularly when ground, turned and polished pins are employed, and pins of this kind perform particularly well in combination with the plastic resinous bushings 40.

It is apparent that many modifications and variations of this invention as hereinbefore set forth may be made without departing from the spirit and scope thereof. The specific embodiments described above are given by way of example only, and the invention is limited only by the terms of the appended claims.

What is claimed is:

1. A straw walker for a grain combine comprising in combination a housing having a top and side walls, a plurality of parallel generally horizontally disposed straw walkers each having parallel side walls and upwardly directed teeth facing the same direction for carrying straw longitudinally through the housing, a plurality of parallel substantially identical crank shafts mounted for rotation upon the grain combine below the straw walker and generally at right angles thereto each crank shaft having the same number of throws, bearings on the lower aspect of each of the straw walkers and each of the bearings being mounted upon one throw of the crank shaft adjacent thereto, each of the crank shafts is built up from separate pieces comprising a plurality of parallel crank arms bored at each end to receive a crank throw pin or crank shaft pin, the latter being journaled for rotation upon said grain combine and said crank throw pins being journaled within the bearings on the straw walkers, fasteners securing the pins rigidly within the bores in the crank arms, said fasteners comprise fastener means establishing the angular orientation between the pins and the crank arms to precisely position the throws at uniformly spaced locations and retaining means secured between the arms and the pins locking the pins in position, synchronizing drive means connected between the crank shafts for rotating the crank shafts in the same direction and at the same speed and motive power means operatively connected to the crank shafts for imparting rotation thereto.

2. The straw walker mechanism of claim 1 wherein the bearings connected to the straw walkers are split bearings and tubular bushings are positioned within the split bearings and the bushings are rotatably mounted over the crank throw pins of the crankshafts.

3. The apparatus of claim 2 wherein the split bearings are counterbored and bearing seals are recessed within the counterbores to seal the bushings.

4. The apparatus of claim 1 wherein at least three straw walkers are provided, a pair of said crankshafts is provided, the crankshafts are each journaled for rotation upon the combine and connected to the straw walker adjacent to the end of each straw walker, and each of the bearings mounted upon the crank throw pins comprises a split bearing secured to the underside of one of the straw walkers, said split bearing contains a plastic resinous bushing mounted for rotation upon each of the crank throw pins and each of the crank throw pins is ground and polished to fit the bushing whereby precise tolerances can be maintained and damged or worn pieces of the crankshaft can be separately removed and replaced as required.

5. The apparatus of claim 2 wherein the pins of the crankshaft are ground turned and polished and the bushings comprise a self-lubricating plastic resinous bearing material.

* * * * *